United States Patent
Shaked et al.

[19]

[11] Patent Number: 5,991,438
[45] Date of Patent: Nov. 23, 1999

[54] COLOR HALFTONE ERROR-DIFFUSION WITH LOCAL BRIGHTNESS VARIATION REDUCTION

[75] Inventors: Doron Shaked, Haifa; Nur Arad, Tel-Aviv, both of Israel; Andrew Fitzhugh, Mountain View, Calif.; Irwin Sobel, Menlo Park, Calif.; Michael D. McGuire, Palo Alto, Calif.

[73] Assignee: Hewlett-Packard Company, Palo Alto, Calif.

[21] Appl. No.: 08/903,899

[22] Filed: Jul. 31, 1997

[51] Int. Cl.$^6$ .............................. H04N 1/405; H04N 1/52
[52] U.S. Cl. ......................... 382/162; 382/252; 358/534
[58] Field of Search ................................. 358/456, 521, 358/460, 75, 443

[56] References Cited

U.S. PATENT DOCUMENTS

| | | | |
|---|---|---|---|
| 5,070,413 | 12/1991 | Sullivan et al. | 358/456 |
| 5,375,002 | 12/1994 | Kim et al. | 358/521 |
| 5,734,369 | 3/1998 | Priem et al. | 345/155 |
| 5,883,973 | 3/1999 | Pascovici et al. | 382/270 |

*Primary Examiner*—Scott Rogers

[57] ABSTRACT

Error diffusion algorithms such as the celebrated Floyd Steinberg error-diffusion algorithm are high-performance halftoning methods in which quantization errors are diffused to "future" pixels. Originally intended for grayscale images, they are traditionally extended to color images by error-diffusing each of the three color planes independently (separable error-diffusion). Adding a design rule which is based on certain characteristics of human color perception to the error-diffusion paradigm results in a color halftoning algorithm having output of considerably higher quality when compared to separable error-diffusion. These benefits are achieved by adding the Minimum Brightness Variation Criterion (MBVC) to the design rules of color error-diffusion halftoning methods. Halftone values are constrained to be vertices of a Minimum Brightness Variation Quadruple (MBVQ) associated with each pixel of the color image being processed. The algorithm presented requires no additional memory and entails a reasonable increase in run-time.

17 Claims, 6 Drawing Sheets

COLOR HALFTONE ERROR-DIFFUSION WITH LOCAL BRIGHTNESS VARIATION REDUCTION

BACKGROUND OF THE INVENTION

1. Field of the Invention

The present invention relates to digital image processing and, more particularly, to processing color halftone images.

2. Description of the Related Art

Monochrome halftone algorithms are carefully designed to reduce visible artifacts. Current color halftoning algorithms are usually a Cartesian product of three halftoned monochrome planes corresponding to the color components of the image. See, for example, A. Zakhor, S. Lin and F. Eskafi, "A New Class of B/W and Color Halftoning Algorithms", International Conference on Acoustics, Speech and Signal Processing, 1991.

To produce a good color halftone one has to place colored dots so that the following specifications are optimally met:

(1) The placement pattern is visually unnoticeable.

(2) The local average color is the desired color.

(3) The colors used reduce the notice-ability of the pattern.

The first two design criteria are easily carried over from monochrome algorithms. However, the third cannot be satisfied by a simple Cartesian product generalization of monochrome halftoning.

One of the most dominant factors in producing halftone noise artifacts is the variation in the brightness of the dots. In monochrome halftones (i.e., Black and White), this factor cannot be mitigated. In color halftoning there are however colors that could be rendered using different halftone-color sets (with different brightness variation). To be able to use those specific halftone-colors in the actual rendering the color planes would have to be correlated. Hence a simple Cartesian product generalization of monochrome halftoning will not address this problem.

In U.S. patent application Ser. No. 08/641,304, filed Apr. 30, 1996, entitled "Joint Design of Dither Matrices for a Set of Colorants" and assigned to the same entity as this application, Jan Allebach and Qian Lin describe a criterion to use colors selected to reduce the notice-ability of the pattern. In their implementation, they disable the use of certain halftone-colors when rendering some colors. However, their interpretation of the third criterion is only partial and hence their application achieves only part of the possible halftone noise reduction.

Thus, it can be seen that color halftone imaging techniques impose pattern notice-ability limits upon halftone image output devices, and hinder the use of these devices in many applications.

Therefore, there is an unresolved need for a technique that can create better color halftone images by correctly incorporating the third design criterion (i.e., by using colors that reduce the notice-ability of the pattern).

SUMMARY OF THE INVENTION

A process and apparatus is described to reduce the notice-ability of the pattern of color halftoned images by a process of color diffusion. The color diffusion process transforms error-diffusion halftoning algorithms so that they produce color halftones conforming to the third color design criterion which is embodied in the Minimum Brightness Variation Criterion (MBVC).

Error diffusion algorithms such as the celebrated Floyd Steinberg error-diffusion algorithm are high-performance halftoning methods in which quantization errors are diffused to "future" pixels. Originally intended for grayscale images, they are traditionally extended to color images by error-diffusing each of the three color planes independently (separable error-diffusion). Adding a design rule which is based on certain characteristics of human color perception to the error-diffusion paradigm results in a color halftoning algorithm having output of considerably higher quality when compared to separable error-diffusion.

These benefits are achieved by adding the MVBC to the design rules of color error-diffusion halftoning methods. Halftone values are constrained to be vertices of a Minimum Brightness Variation Quadruple (MBVQ) associated with each pixel of the color image being processed. The algorithms presented require no additional memory and entail a reasonable increase in run-time.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–6. Those skilled in the art will readily appreciate that the detailed description given herein with respect to these figures is for explanatory purposes, however, because the invention extends beyond these limited embodiments.

Figure 1:
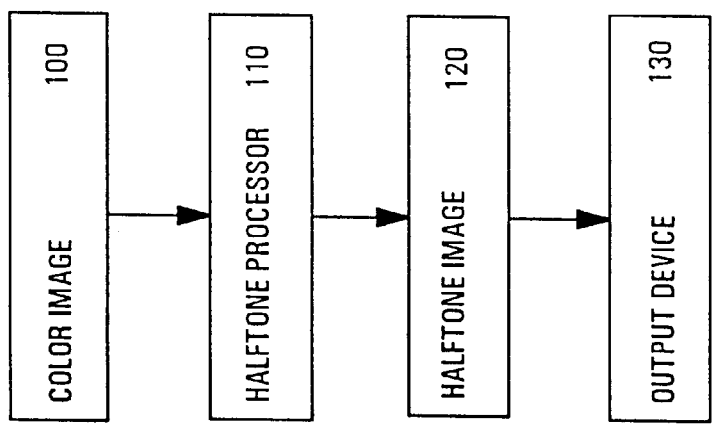
FIG. 1 is a block diagram illustrating an apparatus for processing and displaying a color halftoned digital image using an error-diffusion color halftoning scheme that practices local brightness variation reduction according to the present invention.

FIG. 1 is a block diagram illustrating an apparatus for processing and displaying a color halftoned digital image using an error-diffusion color halftoning scheme that practices local brightness variation reduction according to the present invention. In FIG. 1, digital color image 100 is processed by halftoning processor 110 to yield color halftone image 120, which is then generated by output device 130. Halftone processor 110 may operate using any known error-diffusion color halftoning technique. However, as will be described below in greater detail, the error-diffusion technique of halftone processor 110 has been modified to reduce local brightness variation when operating on digital color image 100 to form halftone image 120.

For example, the celebrated Floyd Steinberg error-diffusion algorithm is a high-performance halftoning method in which quantization errors are diffused to "future" pixels. Originally intended for grayscale images, it is traditionally extended to color images by error-diffusing each of the three color planes independently (separable error-diffusion). As will be described below, adding a design rule which is based on certain characteristics of human color perception to the error-diffusion paradigm results in a color halftoning algorithm having output of considerably higher quality when compared to separable error-diffusion. These benefits are achieved by restricting the brightness variation of the output halftone. The algorithm presented requires no additional memory and entails a reasonable increase in run-time.

Figure 2:
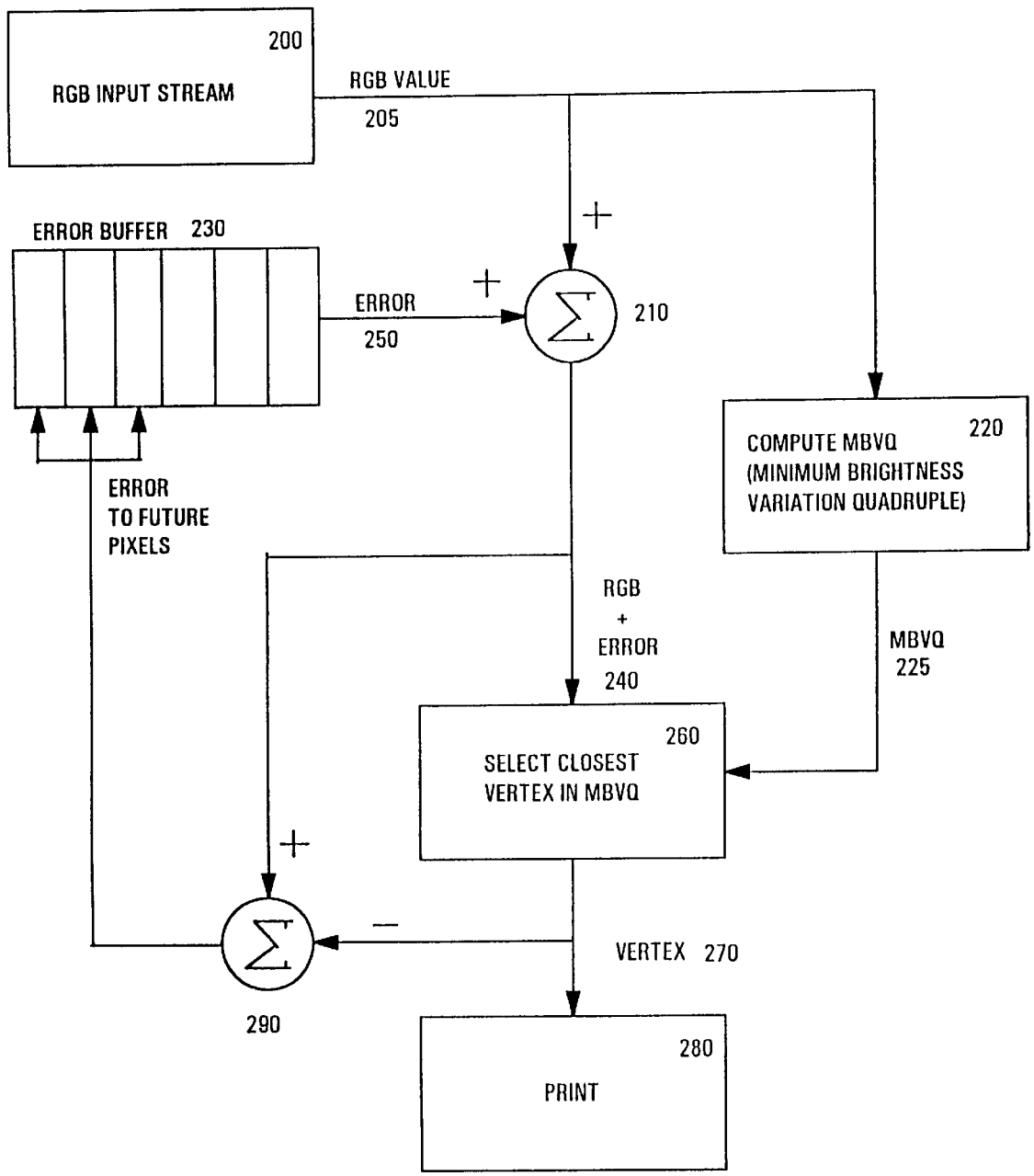
FIG. 2 is a block diagram illustrating a color-diffusion halftoning apparatus suitable for applying color halftone local brightness variation reduction according to the present invention.

FIG. 2 is a block diagram illustrating an error-diffusion halftoning apparatus suitable for applying color halftone local brightness variation reduction as in processor 110. RGB input stream 200 provides RGB values 205 to summer 210 and minimum brightness variation quadruple (MBVQ) computer 220. An error term 250 from error buffer 230 is also provided to summer 210, which in turn combines (i.e., sums) RGB value 205 and error value 250, to result in the RGB+error value 240.

As will be described later in greater detail, MBVQ computer 220 calculates the MBVQ 225 for the RGB value 205 from the RGB stream 200. Based upon the combined RGB and error value 240, vertex selector 260 selects the closest vertex 270 of the MBVQ 225.

The color associated with vertex 270 is placed in the halftone image to be printed 280 at the location associated with RGB value 240. A revised error term is calculated by summer 290 and stored in error buffer 230.

Alternately, rather than operating using RGB values 205 from RGB input stream 200, MBVQ computer 220 may operate using the combined RGB and error value 240 from summer 210. For this alternate embodiment, MBVQ computer 220 calculates the minimum brightness variation quadruple for the combined RGB and error value 240 output from the summer 210.

Figure 3:
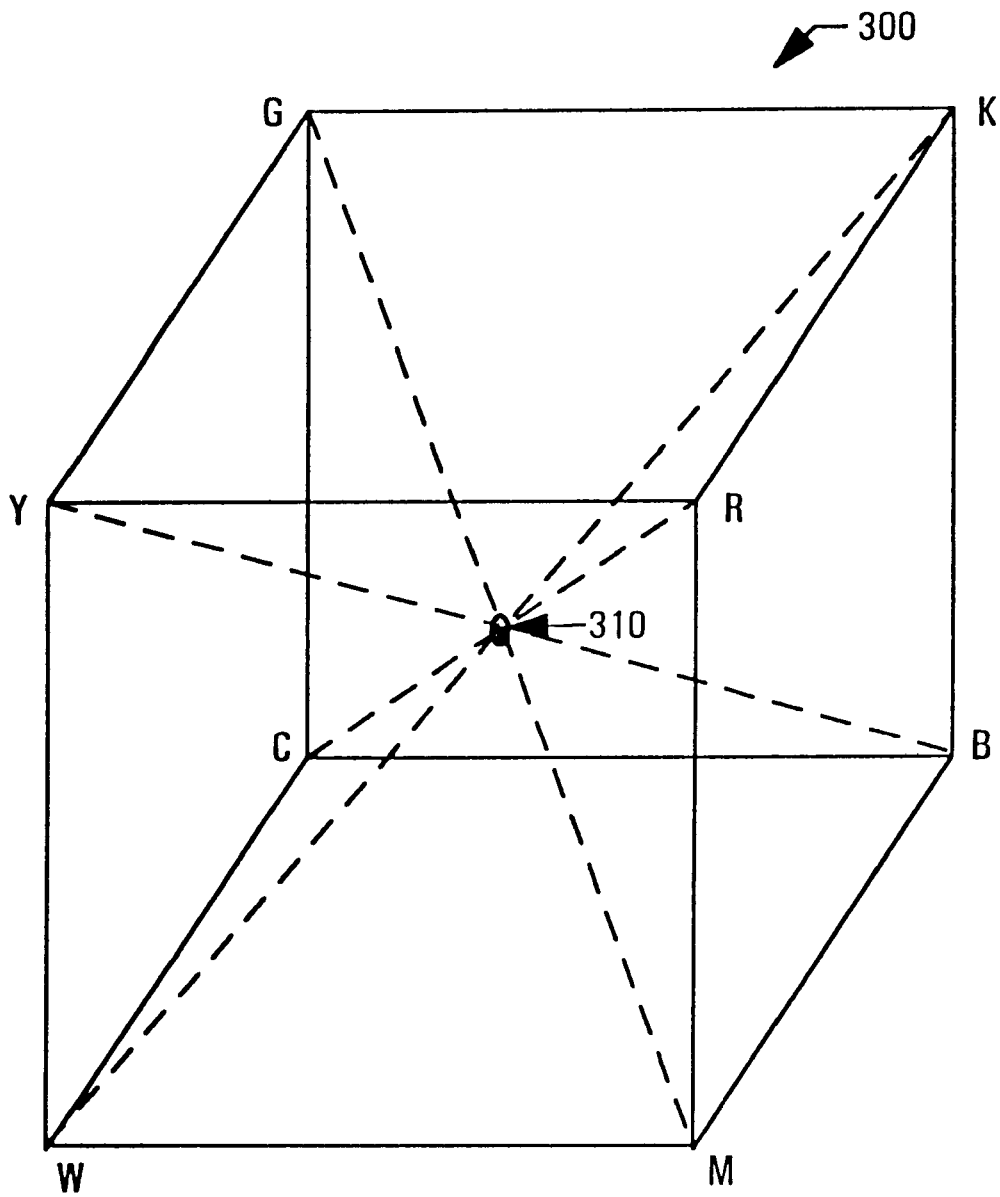
FIG. 3 is a drawing illustrating the RGB cube, with main diagonals meeting on 50% gray.
Figure 4A:
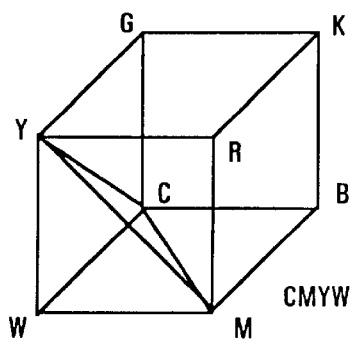
FIGS. 4A through F are drawings illustrating the partition of the RGB cube into six classes, each of which is the convex hull of the minimal brightness variation quadruple used to render colors in that class, as practiced according to one embodiment of the present invention.
Figure 4B:
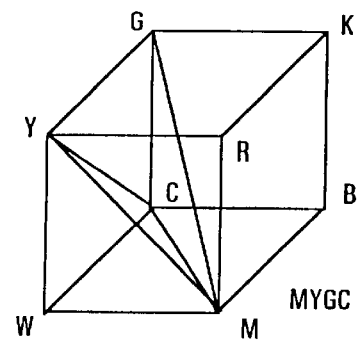
Figure 4C:
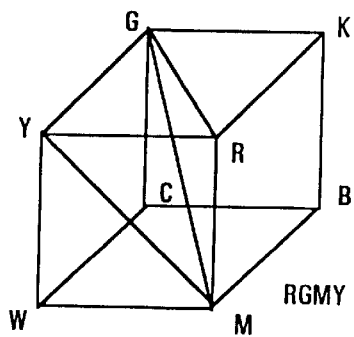
Figure 4D:
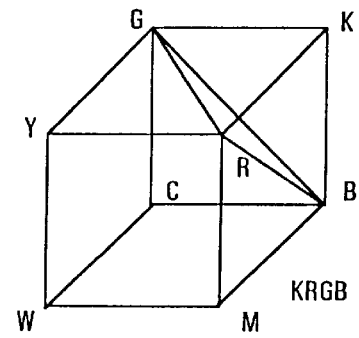
Figure 4E:
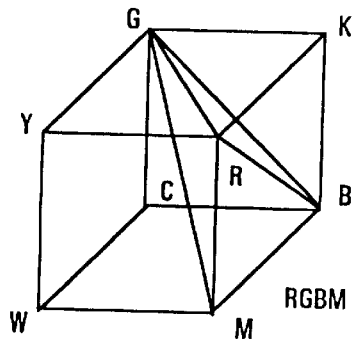
Figure 4F:
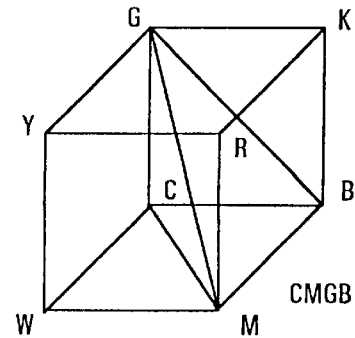

The underlying principle of operation of minimum brightness variation halftone processor 130 is best explained by example. Take for example, a solid patch of 50% Gray. Suppose some dot pattern (e.g., checkerboard) is selected. This pattern could be equally rendered with Black and White dots as with Blue and Yellow, Red and Cyan, or Green and Magenta dots. FIG. 3 is a drawing illustrating the RGB cube and its main diagonals, meeting on 50% gray 310. As can be seen in FIG. 3, the color of the halftoned patch will, theoretically, be the same in all cases. The noise effect, however, will be different. Green and Magenta being almost equally bright will have a low noise effect, in contrast to, for example, Black and White.

The example demonstrates the benefits of adding the proposed MBVC to the design rules of color halftoning methods. We will analyze this additional criterion by examining a simple case of rendering patches of arbitrary solid color.

Natural images are much more complex than patches of solid color, and halftoning algorithms are carefully designed to optimally render a variety of textures and patterns. Each halftoning algorithm, e.g., Dithering, or Error-Diffusion, uses different techniques, which interpret the same design criteria differently. Incorporation of the additional color criterion to each of the basic halftone methods requires a separate approach. Herein, we propose modifying the Error Diffusion method, to produce less noisy halftones based on the MBVC.

A post processor that imposes this additional color criterion onto arbitrary color halftone images generated using any of the various halftoning methods deserves special treatment, and is described in co-pending patent application U.S. application Ser. No. 08/904,026, entitled "Ink Relocation for Color Halftones", filed on even date herewith. Therein is presented Ink Relocation, a postprocess which transforms arbitrary halftones to halftones conforming to the new color design criterion.

Solid Color Patches

In this section we analyze the color design criterion in the special case of rendering a large patch of an arbitrary solid color. It is known that given a color in the RGB cube, it may be rendered using the 8 basic colors located at the vertices of the cube. The question then becomes, how do existing Error Diffusion algorithms select the color dots to be used? The answer is that in Error Diffusion practically all 8 basic colors are used in rendering any solid color patch, their appearance ratio being some decreasing function of their distance from the desired color.

Actually, any color may be rendered using no more than 4 colors, different colors requiring different quadruples. Moreover, the quadruple corresponding to a specific color is, in general, not unique (in a linear color space, any quadruple whose convex hull contains the desired color will do). The issue we raise in this section is: Suppose we want to print a patch of solid color, what colors should we use? Note that in all previous work done on halftoning the issue was what pattern should the dots be placed in, and less often how many dots of each color should be used.

Consider the basic rationale of halftoning: When presented with high frequency patterns, the human visual system "applies" a low-pass filter and perceives only their average. Current inkjet printing resolution (up to approximately 600 dpi) can still be resolved by the human visual system, thus still higher frequencies may have to be achieved. Relevant to the problem at hand is the fact that the human visual system is more sensitive to changes in brightness than to the changes in chrominance, which average at much lower frequencies. Thus we arrive at the Minimal Brightness Variation Criterion for halftoning of solid color patches:

The Minimal Brightness Variation Criterion (MVBC)

To reduce halftone noise, select from within all color sets by which the desired color may be rendered, the one whose brightness variation is minimal.

There are several standard "visually uniform" color spaces, and standard color difference measures. See, for example, G. Wyszecki and W. S. Stiles, *Color Science: Concepts and Methods, Quantitative Data and Formulae*, Second edition, John Wiley and Sons, 1982. The proposed minimal brightness variation criterion is not necessarily equivalent to choosing the set whose maximal difference measure is minimal. The rationale behind our preference of an apparent one-dimensional projection (on the luminance axis) of a more general measure is that the visually uniform color spaces and the resulting color difference measures were developed for large solid color patches. We, on the other hand, consider colors in a high frequency pattern. Chrominance differences between participating colors plays a part, however, due to the stronger low-pass in the chrominance channel, they matter much less than is embodied in the standard color difference formulas. We maintain that at the resolution of a typical CMYK printer the Minimal Brightness Variation Criterion is a reasonable one. The MBVC is extendible to a possibly more accurate color criterion, Minimum Perceivable Noise Criterion.

To consider the brightness variation of color sets we need only to order the eight basic colors on a brightness scale. In color theory (see, for example, L. D. Grandis, *Theory and Use of Color*, translated by J. Gilbert, Prentice Hall, Inc. and Harry N. Abrams, Inc., 1984), the primary colors (Cyan, Magenta and Yellow), and secondary colors (Red, Green and Blue) have a specific brightness order: Blue is the darkest secondary color and Green is the brightest. Their complementary colors Yellow (complements Blue) is the brightest primary and Magenta (complements Green) is the darkest. Hence, we have two color orders: The "dark" colors ordered {KBRG}, and the "bright" ones ordered {MCYW}. The question then becomes, what is the combined brightness order.

It would be only natural to assume that the bright colors are always brighter than the dark ones. Indeed, using most inks this is the case. However, if other inks (or other media for that matter) are used, this may change. For example, colors rendered on some CRT screens have a different brightness ordering: {KBRMGCYW}, in which Magenta is darker than Green. It is easily seen that this permutation is actually the only one possible in current three-color systems. Current technology produces Red as a two ink-drop overlay of Magenta and Yellow. Similarly Blue is an overlay of Magenta and Cyan. Thus Magenta cannot be darker than Red or Blue. Green cannot be brighter than Cyan or Yellow, because it is produced as an overlay of Cyan and Yellow. This argument is valid in a subtractive three-color system (e.g., printing). A similar argument may be formulated for additive color systems (e.g., CRTs).

An interesting expected by-product of the use of the minimal brightness variation criterion is that color patches are rendered as more saturated. This phenomenon is highly dependent on the media (e.g., paper type) and the incorporated color correction. Improved color saturation is expected because when applying the minimal brightness variation criterion, neutral dots (K or W) are discarded, and saturated dots (R, G, B, C, M, or Y) are used instead. Thus rendered patches appear far from the neutral (Gray) axis (the K-W axis in FIG. 3).

Let us consider once more the simple example of large patches of solid color. In Separable Error-Diffusion practically all 8 basic colors are used rendering any solid color patch, their appearance ratio being some decreasing function of their distance from the desired color. However, the use of 8 colors (where 4 would suffice) stands in blunt contradiction to the MBVC (because for almost any solid color, Black and White, whose brightness variation is maximal, will be used). Thus, as a first step we partition the RGB cube into six pyramids, each of which having the property that the brightness variation between the four vertices is minimal. A detailed reasoning of this partition appears in the description of Ink Relocation, copending patent application U.S. application No. 08/804,026.

FIGS. 4A through F show the partition of the RGB cube to six volumes, each of which is the convex hull of the minimum brightness variation quadruple used to render colors in that pyramid. Note that all of the pyramids are of equal volume, but are not congruent. Names are added for future reference.

The Color Diffusion Algorithm

In the following, denote by RGB(i,j) the RGB value at pixel (i,j) and by e(i,j) the accumulated error at pixel (i,j). The Color Diffusion algorithm may be formalized as follows:

For each pixel (i,j) in the image do:
1. Determine the Minimal Brightness Variation Quadruple (MBVQ) of RGB(i,j) (i.e., 220 in FIG. 2).
2. Find the vertex v ∈ MVQB which is closest to RGB (i,j)+e(i,j) (i.e., 260 in FIG. 2).
3. Compute the quantization error RGB(i,j)+e(i,j)−v (i.e., 290 in FIG. 2).
4. Distribute the error to "future" pixels (i.e., 230 in FIG. 2).

Therefore, a primary difference between separable error-diffusion and color diffusion is in step (2), where the algorithm looks for the closest vertex out of the MBVQ, as opposed to the closest vertex out of the eight vertices of the cube. Thus, any separable error diffusion type algorithm (regardless of the exact manner in which errors are computed or are distributed) may be modified to a color diffusion type algorithm. For one embodiment, we used four-point diffusion, with 95% of the error being distributed with initially randomized fixed lookup tables.

With respect to the process of MBVQ computer 220, given an arbitrary RGB triplet, determining the pyramid which it belongs to requires between 2 and 3 comparisons on the average. The following code can be used to determine the appropriate MBVQ pyramid for three-Byte RGB triplets, but can be easily adapted to other pixel value representations.

```
inline pyramid position (Byte R, Byte G, Byte B)
{
    if ((R + G) & 256)
        if ((G + B) & 256)
            if ((R + G + B) & 512)          return CMYW;
            else                            return MYGC;
        else                                return RGMY;
    else
        if(!((G + B) & 256))
            if(!((R + G + B) & 256))        return KRGB;
            else                            return RGBM;
        else                                return CMGB;
}
```

Figure 5:
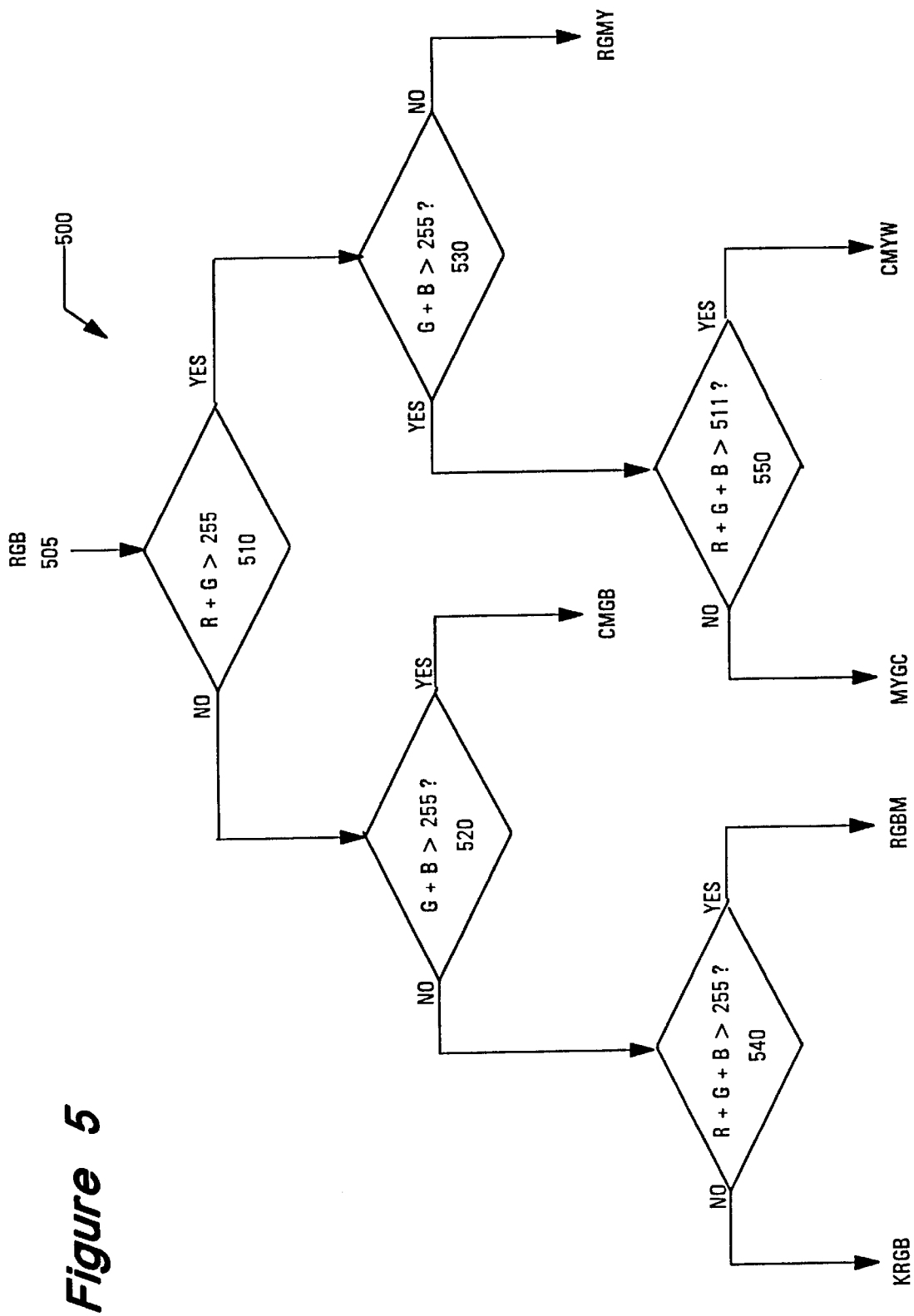
FIG. 5 is a decision tree for determining the pyramid to which an arbitrary RGB triplet belongs for color error diffusion with local brightness variation reduction as practiced according to one embodiment of the present invention.

FIG. 5 corresponds to the above code and is a decision tree for determining the pyramid to which an arbitrary RGB triplet belongs. Thus, in decision tree 500 the sum of the R and G values of the triplet 505 is tested in decision 510 to see if the sum is greater than the value 255. If the answer to decison 510 is "yes", then the sum of the G and B values of the triplet is tested in decision 530 to see if this sum is greater than the value 255. If the answer to decison 530 is "no", then the RGB triplet belongs to the RGMY pyramid. On the other hand, if the answer to decison 530 is "yes", then the sum of the R, G and B values of the triplet is tested in decision 550 to see if this sum is greater than 511. If the answer to decison 550 is "yes", then the RGB triplet belongs to the CMYW pyramid. On the other hand, if the answer to decison 550 is "no", then the RGB triplet belongs to the MYGC pyramid.

Returning to decision 510, if the answer to decison 510 is "no", then the sum of the G and B values of the triplet is tested in decision 520 to see if this sum is greater than the value 255. If the answer to decison 520 is "yes", then the RGB triplet belongs to the CMGB pyramid. On the other hand, if the answer to decison 520 is "no", then the sum of the R, G and B values of the triplet is tested in decision 540 to see if this sum is greater than 255. If the answer to decison 540 is "yes", then the RGB triplet belongs to the RGBM pyramid. On the other hand, if the answer to decison 540 is "no", then the RGB triplet belongs to the KRGB pyramid.

The issue of finding the closest vertex v ∈ MVBQ (the process of vertex selector 260) deserves special attention. When applying separable error-diffusion each component of the RGB value is compared to the threshold value 127, and a tessellation of with respect to the eight vertices is formed. Note that the norm used to form the tessellation is not explicitly stated, but a closer look reveals that this is not necessary: Due to symmetry properties between the eight vertices any $L^p$ ($1 \leq p \leq \infty$) norm gives rise to the same tessellation of with respect to the eight vertices of the cube. The same does not hold when a tessellation relative to a proper subset of the eight vertices is called for: Although when restricted to the RGB cube itself, any given quadruple gives rise to the same tessellation regardless of $L^p$ norm used, however outside the cube these tessellations may differ. Easiest to compute is the $L^2$ tessellation, in which the decision planes inside the cube are actually valid for all of . Thus, for each of the six pyramids, determining the closest vertex to a given point entails traversing a decision tree of depth 3. A description of one of the trees is shown in FIG. 6.

Figure 6:
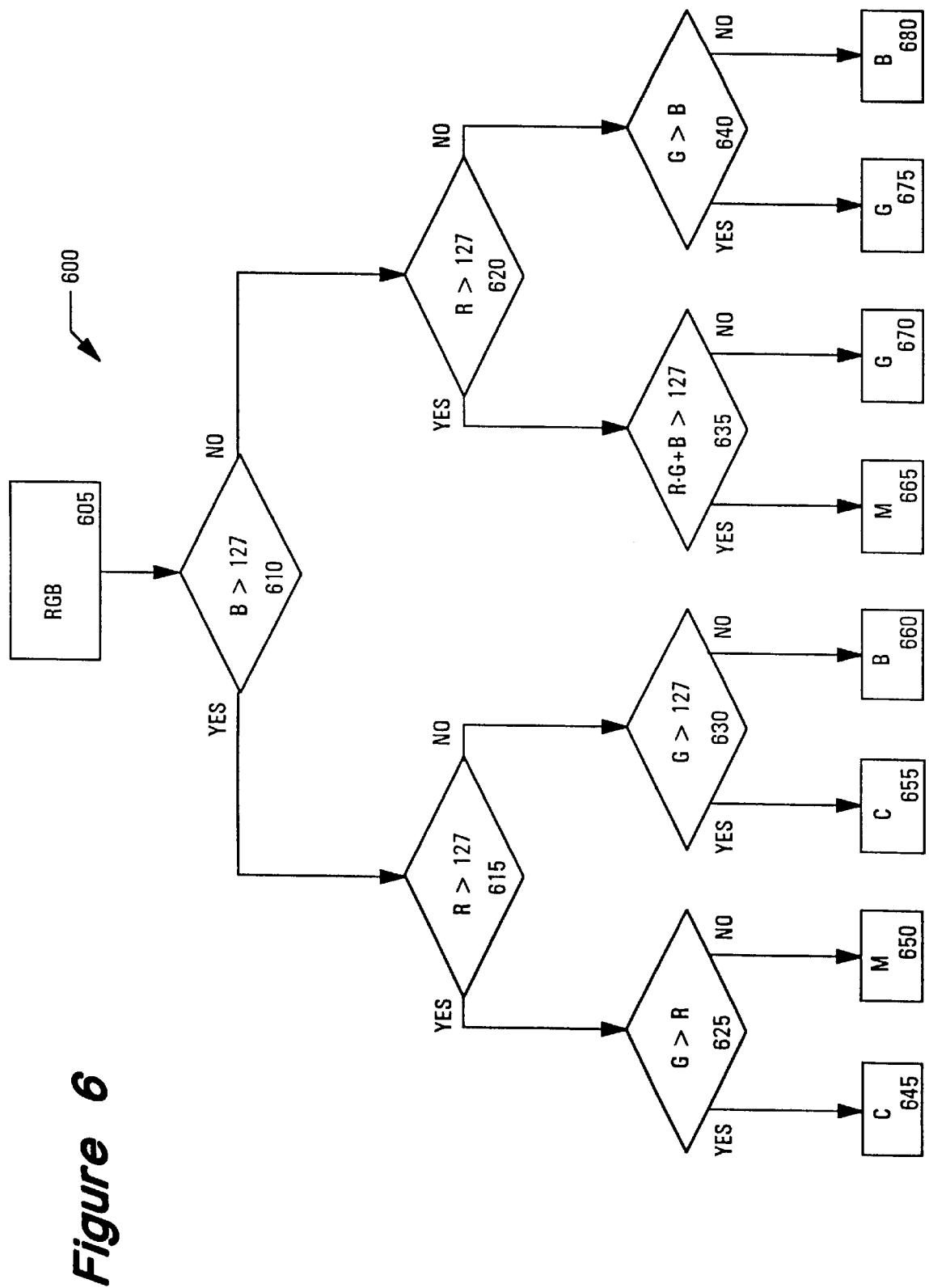
FIG. 6 is a decision tree for determining the tesselation of space relative to the vertices of the CMGB pyramid for color error diffusion with local brightness variation reduction as practiced according to one embodiment of the present invention.

FIG. 6 is a decision tree for determining the tesselation of space relative to the vertices of the CMGB pyramid the color diffusion algorithm as practiced according to one embodiment of the present invention. All comparisons in tree 600, as well as in the decision trees for the other five pyramids, are of the type x>127 or x>y or x−y+z>127, and the third type appears only once in every tree.

Note that decision tree 600 is invoked in the process of vertex selector 260 only if the corresponding MBVQ pyramid 225 is CMGB. If the MBVQ pyramid 225 is one of the other five pyramids, a similar though different decision tree is invoked. The RGB value 605 is thus value 240 (i.e., the elementwise (separable) accumulation of the input RGB 205 and the accumulated error 250).

Thus, the B value of the triplet 605 is tested in decision 610 to see if it is greater than the value 127. If the answer to decison 610 is "yes", then the R value of the triplet is tested in decision 615 to see if it is greater than the value 127. If the answer to decison 615 is "yes", then the G value of the triplet is tested in decision 625 to see if it is greater than the R value. If the answer to decison 625 is "yes", then the C vertex is the vertex of the CMGB pyramid closest to the RGB value 605 (block 645). On the other hand, if the answer to decison 625 is "no", then the M vertex is the vertex of the CMGB pyramid closest to the RGB value 605 (block 650).

Returning to decision 615, if the answer to decison 615 is "no", then the G value of the triplet is tested in decision 630 to see if it is greater than the value 127. If the answer to decison 630 is "yes", then the C vertex is the vertex of the CMGB pyramid closest to the RGB value 605 (block 655). On the other hand, if the answer to decison 630 is "no", then the B vertex is the vertex of the CMGB pyramid closest to the RGB value 605 (block 660).

Similarly, if the answer to decison 610 is "no", then the R value of the triplet is tested in decision 620 to see if it is greater than the value 127. If the answer to decison 615 is "yes", then the sum of the R and B values less the G value of the triplet 605 is tested in decision 635 to see if it is greater than the value 127. If the answer to decison 635 is "yes", then the M vertex is the vertex of the CMGB pyramid closest to the RGB value 605 (block 665). On the other hand, if the answer to decison 635 is "no", then the G vertex is the vertex of the CMGB pyramid closest to the RGB value 605 (block 670).

Returning to decision 620, if the answer to decison 620 is "no", then the G value of the triplet is tested in decision 640 to see if it is greater than the B value. If the answer to decison 640 is "yes", then the G vertex is the vertex of the CMGB pyramid closest to the RGB value 605 (block 675). On the other hand, if the answer to decison 640 is "no", then the B vertex is the vertex of the CMGB pyramid closest to the RGB value 605 (block 680).

Decision trees for the other MBVQ pyramids can be fashioned in the same manner as that of the CMGB pyramid of FIG. 6. In any case, assuming the minimal brightness quadruple has been computed (2–3 comparisons), determining the closest vertex costs three comparisons and at most two additions, as opposed to three comparisons for separable error-diffusion. We stress again that the resulting tessellation is the one induced by the $L^2$ norm. It coincides with any $L^p$ tessellation only inside the cube. Using a particular $L^p$ tessellation is not necessarily advantageous, because it is well-known that RGB space is not perceptually uniform in the sense that visual metrics and the $L^p$ metrics do not give rise to the same tessellations.

Determining the optimal tessellation is related to stability considerations of the color diffusion algorithm and to additional factors involving human color perception. However, our experience indicates stability of the proposed algorithm.

EXAMPLES

We have studied solid color patches rendered at 75 dpi using different halftoning methods. (A) Separable error-diffusion. (B) The ink-relocation post-process applied to separable error-diffusion. (C) Color diffusion halftoning used. We note the decrease in halftone noise from A to C.

For example, in one case we studied the application of several halftoning algorithms to a solid patch with value RGB-(127, 179, 78), and printed at 75 dpi. The separable error-diffusion algorithm rendered the patch with eight colors, and dark drops adjacent to light ones were abundant. After application of the ink-relocation post-process rendering was still done with all eight colors, however Black appeared only once (due to boundary effects) and White was very rare. An overall reduction in halftone noise was evident. When we applied color-diffusion to the original patch, only 4 colors (B, C, G, M) were used, and halftone noise was virtually brought to a minimum.

We also studied application of the same halftoning methods to high-resolution natural images. For example, we studied a high-resolution image rendered using different halftoning methods: (A) Separable error-diffusion. (B) The ink-relocation post-process with halftone sharpening enhancement applied to separable error-diffusion. (C) Color diffusion halftoning. We again noted a decrease in halftone noise from A to C.

We also studied run-time when applying the various methods. Our results are as follows: Supposing separable error-diffusion takes one unit of time, we found that adding the ink-relocation post-process with no halftone sharpening takes approximately 1.4 units, performing ink-relocation with halftone sharpening takes approximately 1.85 units, and performing the color-diffusion halftone algorithm takes approximately 1.55 units. Note that when invoking color-diffusion halftone sharpening is not needed, because no post-process with a blurring side-effect is used. Comparative run-times depend, in general, on image size and geometry, image content and on hardware-specific issues such as how many scanlines may be buffered up at a time. However, we have found that increase in memory requirements are negligible.

Examples mentioned above were produced by an HP-UX demo written by us. The demo was written in C++, was compiled using the C++ compiler CC on HP-UX machines, and requires in addition only basic image format conversion filters.

Although the discussion above was made within the context of Minimum Brightness Variation Criterion, it should be noted that the MBVC is a special case of a Minimum Perceivable Noise Criterion. Thus, the method and apparatus presented is readily extensible to an MPNC to allow for variations that, for example, include local spatial information (from neighboring pixels).

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A halftoning apparatus for a color image, the apparatus comprising:

means for locally limiting a set of halftone colors to a triplet pyramid, the set being limited so as to minimize dot-noticeability metrics; and means for locally applying the limited set of halftone colors to the color image by use of a decision tree to yield a halftone image.

2. An apparatus as set forth in claim 1, wherein the dot-noticeability metrics are based on a Human Visual system model.

3. An apparatus as set forth in claim 1, that uses Minimum Perceivable Noise Variation as the dot-noticeability metrics.

4. An apparatus as set forth in claim 1, that uses Brightness Variation as the dot-noticeability metrics.

5. A halftoning process for a color image, the process comprising the steps of:

locally limiting a set of halftone colors, the set being limited to a triplet pyramid so as to minimize dot-noticeability metrics; and locally applying the limited set of halftone colors to the color image by use of a decision tree to yield a halftone image.

6. A process as set forth in claim 5, wherein the dot-noticeability metrics are based on a Human Visual system model.

7. A process as set forth in claim 5, that uses Minimum Perceivable Noise Variation as the dot-noticeability metrics.

8. A process as set forth in claim 5, that uses Brightness Variation as the dot-noticeability metrics.

9. An error-diffusion halftone processor for a color image, the processor comprising:

an accumulated error summer to add input RGB to an accumulated error;

a minimum brightness variation quadruple (MBVQ) computer to determine a MBVQ for a pixel within the color image;

a vertex selector to use a decision tree to find a vertex of the MBVQ closest to the pixel and to assign the vertex color to a color halftone at a location corresponding to the pixel;

a quantization error summer to find quantization error based upon using the vertex;

a distributer to distribute the quantization error to future pixels; and a buffer to store quantization error for the future pixels of the color image.

10. The processor as set forth in 9, wherein the MBVQ computer finds the MBVQ for the input pixel.

11. The processor as set forth in claim 9, wherein the MBVQ computer finds the MBVQ for the pixel using the pixel value when combined with an error term for the pixel.

12. An error-diffusion halftone process for a color image comprising the steps of:

adding input RGB to an accumulated error;

determining a minimum brightness variation quadruple (MBVQ) for a pixel within the color image;

using a decision tree to find a vertex of the MBVQ closest to the pixel and assigning the vertex color to a color halftone at a location corresponding to the pixel;

finding quantization error based upon using the vertex;

distributing the quantization error to future pixels; and storing quantization error for the future pixels of the color image.

13. The process as set forth in 12, wherein the step of finding the MBVQ finds the MBVQ for the input pixel.

14. The process as set forth in claim 12, wherein the step of finding the MBVQ finds the MBVQ for the pixel using the pixel value when combined with an error term for the pixel.

15. An error-diffusion halftone processor for a color image, the processor comprising:

means for adding input RGB to an accumulated error;

means for determining a minimum brightness variation quadruple (MBVQ) for a pixel within the color image;

means for using a decision tree to find a vertex of the MBVQ closest to the pixel and assigning the vertex color to a color halftone at a location corresponding to the pixel;

means for finding quantization error based upon using the vertex;

means for distributing the quantization error to future pixels; and means for storing quantization error for the future pixels of the color image.

16. The processor as set forth in claim 15 wherein the means for finding the MBVQ finds the MBVQ for the input pixel.

17. The processor as set forth in claim 15, wherein the means for finding the MBVQ finds the MBVQ for the pixel using the pixel value when combined with an error term for the pixel.

* * * * *